United States Patent [19]
Waaske

[11] 4,012,754
[45] Mar. 15, 1977

[54] PHOTOGRAPHIC CAMERA

[75] Inventor: Heinz Waaske, Mascherode, Germany

[73] Assignee: Rollei-Werke Franke & Heidecke, Braunschweig, Germany

[22] Filed: Mar. 8, 1976

[21] Appl. No.: 664,430

[30] Foreign Application Priority Data

Mar. 14, 1975 Germany .......................... 2511153

[52] U.S. Cl. ................................ 354/212; 354/202
[51] Int. Cl.² ........................................... G03B 1/00
[58] Field of Search .......... 354/202, 287, 204, 212; 350/65

[56] References Cited

UNITED STATES PATENTS

| 3,153,375 | 10/1964 | Zapp | 354/202 X |
| 3,611,896 | 10/1971 | Aoki | 354/202 |
| 3,836,985 | 9/1974 | Lange | 354/287 |

*Primary Examiner*—John Gonzales
*Attorney, Agent, or Firm*—Stonebraker, Shepard & Stephens

[57] ABSTRACT

A photographic camera having a lens opening and a finder opening in the housing or casing of the camera, is provided with a cover plate or blind plate to close these openings when pictures are not being taken, to protect the picture taking lens and the finder lens from possible damage and to prevent entrance of dust or foreign matter into the housing. A manually operable slider controls the movement of the cover plate between its closed and open positions and also moves the film transport means or feeding mechanism, to advance the film through the space of one picture area or "frame." As the amount of film wound on the take-up spool increases so that the diameter of such film increases, a less amount of rotation of the take-up spool is needed in order to advance the film through the space of one picture, and therefore a less amount of movement of the operating slider is needed, and this lesser movement might not be sufficient to shift the cover plate all the way from its closed position to its open position, if the cover plate were directly coupled to the slider. Therefore, the cover plate is coupled to the slider by a lost motion connection, and after the slider has caused some initial movement of the cover plate, an auxiliary drive moves the cover plate the remainder of the distance to its fully open position even though movement of the slider may have stopped.

10 Claims, 3 Drawing Figures

PHOTOGRAPHIC CAMERA

BACKGROUND OF THE INVENTION

The invention relates to a photographic still camera having a film feeding or transport device driven by a rectilinearly moved slider and also having a displaceable cover plate which in its closed position covers the housing openings or windows for the viewfinder and the lens, and in its open position clears these openings or windows.

In a known camera of this general type, the cover plate is externally guided on the camera housing and serves at the same time as a drive for the film transport device. When the cover plate is moved into the position clearing the viewfinder and lens, the film transport device or feeding mechanism is driven at the same time. This advances the film by one picture length or "frame." The film transport is monitored by a feeler lever which, after exactly one picture length, drops into a perforation of the film and blocks the further movement of the film transport device.

In a camera of such construction, there is the difficulty that the shifting distance of the film transport slider used at the same time as a cover plate, which is necessary in order to transport the film by one picture length, is not constant over the whole length of the film strip, but decreases with increasing diameter of the film wound on the take-up spool. This has the result that when the film wound on the take-up spool reaches a relatively large diameter, near the end of the film strip, the film transport device blocks before the viewfinder and lens are completely cleared by the cover slider. In order to avoid this, in a known camera a planet wheel gearing is provided which uncouples the film transport slider or the cover plate from the film transport device as soon as the latter is blocked by the entering feeler lever. In this way the cover plate can always be pushed into its end position clearing the viewfinder and lens, independently of the necessary film transport distance.

However, such a planet wheel gearing requires high precision with consequent expense both in production and in the assembly of the camera, and causes considerable manufacturing difficulties especially in installation in miniature cameras.

The present invention is based upon the problem of producing a camera of the general type initially stated in which the above mentioned difficulties or disadvantages are fully overcome. According to the invention, the film transport slider and the cover plate for viewfinder and lens are so designed and arranged in a simple and operationally reliable manner that by means of the film transport slider the cover plate is transferred completely from its closed position into its open position with simultaneous film transport, independently of the extent of displacement of the film transport slider required for an advance of one picture.

SUMMARY OF THE INVENTION

According to the present invention the problem is solved by coupling the slider and the cover plate to each other in such a way that a limited relative movement remains between them, and by providing an auxiliary drive for the displacement of the cover plate into its fully open position. The auxiliary drive insures that the cover plate is always transferred completely into its open position, irrespective of what distance the slider must travel in order to transport the film by one picture length. The return of the cover plate into its closed position with simultaneous cocking or tensioning of the auxiliary drive is effected by means of the film transport slider.

In an especially expedient development of the invention, the auxiliary drive is designed so that it is ineffective when the cover plate is in the closed position, and it can be set in action only by moving of the cover plate out of its closed position. This has the advantage that it is not necessary to provide a separate locking and unlocking device for the auxiliary drive or for holding the cover plate in its closed position.

In an advantageous further development of the invention the auxiliary drive comprises a lever pivotable by spring force. When the cover plate is in the closed position, the lever assumes a position in which the lever force acts transversely of the shifting direction or displacement direction of the cover plate. After movement of the cover plate out of its closed position, the auxiliary drive lever swings or pivots into a position in which the lever force is directed in the direction of displacement of the cover plate.

According to a preferred embodiment of the invention, this can be realized in a simple manner. The cover plate is provided with a projection. The auxiliary drive lever is pivotable about a fixed point in the housing. When the cover plate is in the closed position, the lever abuts on a side face of the projection extending along the displacement direction, and after movement of the cover plate out of its closed position, the lever abuts on a second side face of the projection extending perpendicularly to the first side face, such abutment taking place under spring force.

The relative movement between the slider and the cover plate is rendered possible, according to an advantageous development of the invention, by providing idle or lost motion distance which corresponds at least to the difference between the displacement distance of the cover plate from its closed position into its open position and the minimum displacement distance of the film transport slider necessary for advancement by the length of one picture.

The coupling of the slider and the cover plate with inclusion of the required relative movement between the two is realized, according to an expedient further development of the invention, by providing the cover plate with an aperture the edges of which form abutment surfaces. An extension on the slider engages with these abutment surfaces to drive the cover plate in one direction or the other. The length of the aperture in the displacement direction is equal to the sum of the width of the extension in the displacement direction plus the idle travel or extent of lost motion. The aperture is here arranged in the cover plate in such a way that when the slider is in the basic rest position and the cover plate is in the closed position, the slider extension abuts on one end of the aperture, holding the cover plate in its closed position. On actuation of the film transport slider, the latter initially travels the idle distance and then moves the cover plate out of its closed position. Thus the auxiliary drive becomes effective. The auxiliary drive lever which had rested on a side face of the projection extending along the displacement direction of the cover plate, so long as that plate was in its closed position, now presses under spring force against the second side face extending perpendicularly of the first side face of the extension, and the pressure thereof displaces the cover plate until it has reached its fully open position.

According to a further development of the invention here the distance of the second side face from the abutment point of the lever on the first side face of the extension, when the cover plate is in the closed position, is at most equal to the difference between the minimum shifting distance of the film transport slider necessary for an advance of one picture and the idle distance. Thus it is insured that the film transport slider even at the end of the film, with maximum diameter of the film winding on the take-up spool, in its film transport stroke can shift the cover plate into a position in which it is moved completely into its open position by the auxiliary drive.

DESCRIPTION OF THE PREFERRED EMBODIMENT

Figure 1:
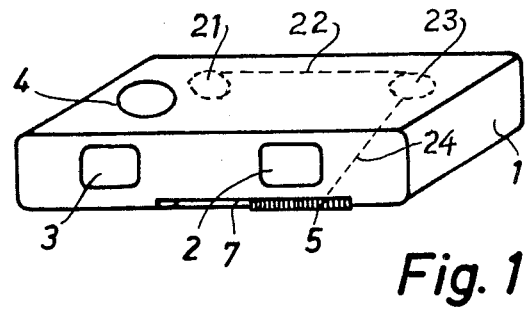
FIG. 1 is a perspective view of a camera in accordance with a preferred embodiment of the invention.

In FIG. 1, the housing or casing of a miniature still camera of compact construction style is designated by 1, which housing has on the front an opening or window 2 in front of the lens and an opening or window 3 in front of the viewfinder. The release member or button 4 is on the upper side of the housing. Pressure on this release member activates the conventional shutter (not shown) to make a photographic exposure in the conventional way.

Figure 3:
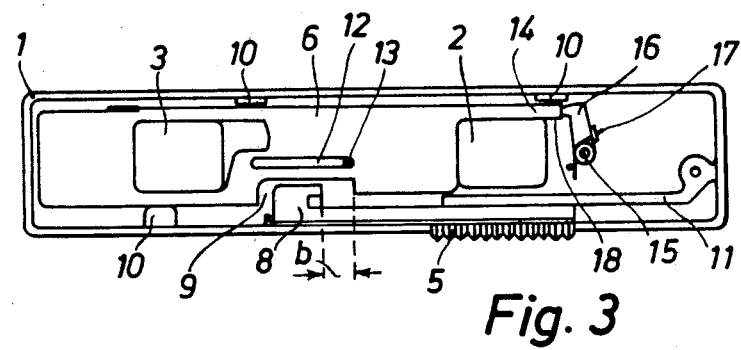
FIG. 3 is a view similar to FIG. 2, with the parts in the picture-taking condition or position.
Figure 2:
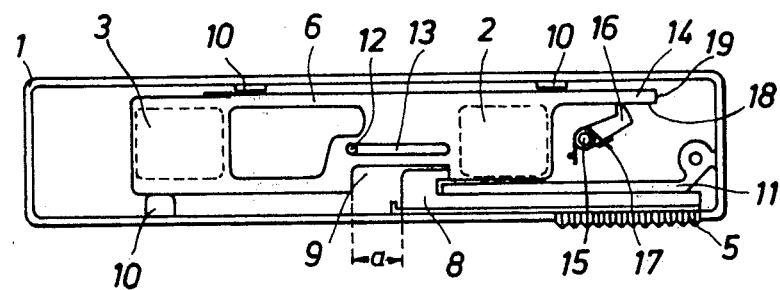
FIG. 2 is a front view of the camera according to FIG. 1 with the camera front plate removed to show the parts within, such parts being in the rest position wherein the cover plate closes the lens and viewfinder window openings.

A manually operable slider 5 for film transport and for cocking or tensioning the shutter is arranged at the lower edge of the front side, which slider at the same time actuates a cover plate 6 which covers and clears respectively the lens and viewfinder openings at the same time (FIGS. 2 and 3). The slider 5 upon manual displacement along its shifting path or slot 7 drives a film transport device or film feeding mechanism, which is known and therefore not shown here in detail. It is sufficient for present purposes to say that this conventional known film feeding mechanism includes a film supply spool schematically indicated at 21, the film travelling thence along a path 22 to the film take-up spool schematically shown at 23, and there is a conventional operative driving connection schematically indicated by the line 24, driving the take-up spool 23 from the slider 5 when the latter is moved leftwardly from the position of FIGS. 1 and 2 toward the position of FIG. 3. Such movement of the slider 5 in each case transports or advances the film by one "frame" or picture length.

The displacement distance of the film transport slider 5 necessary for the advance of the film by one picture length differs according to the diameter of the film winding on the take-up spool 23, and constantly decreases with increasing winding diameter, that is from the beginning to the end of the film. A feeler lever (conventional and likewise not shown) of the film transport device, by dropping into a perforation of the film, stops the motion of the film, causing it to be transported further always by one exact picture length. After the feeler lever has dropped into the perforation, the film transport device is blocked and thus the displacement distance of the slider 5 is limited. The maximum displacement distance of the slider 5 is determined by the requisite advance of the film by one picture length at the beginning of the film, when the effective diameter of the film on the take-up spool 23 is at a minimum.

The film transport slider 5 and the cover plate 6 are coupled with one another by a slider extension 8 which protrudes into an aperture or wide notch 9 of the cover plate. When the slider 5 is in the basic position at the right hand end of its range of travel and the cover plate 6 is in the closed position (see FIG. 2) the slider extension 8 abuts on one edge of the aperture, holding the cover plate in its closed position. The aperture is dimensioned so that on actuation of the slider 5, the slider extension must first travel an idle distance $a$ before it engages the opposite edge of the aperture 9 and starts to displace the cover plate 6 toward the open position.

This idle distance $a$ is dimensioned so that its length corresponds at least to the difference between the displacement distance of the cover plate from its closed position (FIG. 2) into its open position (FIG. 3) and the minimum displacement distance of the film transport slider 5 necessary for one picture advance. In this way it is insured that an adequate relative movement is rendered possible between the film transport slider 5 and the cover plate 6, to permit transferring the cover plate 6 completely into its open position irrespective of the displacement distance of the slider 5 necessary for the film transport.

The cover plate 6 is guided by the guide nipple 10 and a guide rail 11, its displacement distance being limited by a pin-slot connection 12, 13. The cover plate 6 carries a projection or extension 14 at its right hand end when viewed as in FIGS. 2 and 3. A lever 16 pivotable about a fixed point 15 in the housing 1 abuts under the action of a spring 17 on the lower edge 18 of this projection 14 when the cover plate 6 is in the closed position shown in FIG. 2. This lower edge 18 is parallel to the direction of movement of the cover plate 6 and the slider 5. At the right end of the projection 14 there is a lateral edge or surface 19 extending perpendicularly to the lower edge 18. After the parts 6, 14 have moved a slight distance leftwardly, so that the nose of the auxiliary drive lever 16 is no longer held by the surface 18, the lever swings up (counterclockwise in FIGS. 2 and 3) and the nose thereof engages the end surface or edge 19 on the part 14 of the cover plate 6, and pushes leftwardly on this surface 19, thereby moving the cover plate 6 leftwardly to its completely open position even if the slider 5 is unable to continue its leftward movement.

The operation is as follows:

The camera parts are initially in the position shown in FIGS. 1 and 2, in which the slider 5 is in the basic position and the cover plate 6 is in its closed position covering the viewfinder and lens openings 3 and 2 respectively. If a photographic exposure is to be effected, the camera should be converted into its operational position (FIG. 3) by means of the slider 5. In this operation the film is transported further by one picture length and the cover plate 6 is displaced into its open position clearing the viewfinder and lens.

In detail this is effected by manual movement of the slider 5 to the left from the position shown in FIG. 2. During such movement, the slider extension 8 first travels the idle distance a, before it comes to abut on the left side edge of the aperture 9. The film is thereby already advanced or transported by a certain distance because of the operative connection 24 from the slider to the take-up spool 23. Then with further movement of the slider and further transport of the film, the cover plate 6 is moved by the slider extension 8 further to the left. Thereby the lower edge 18 of the projection 14 of the cover plate slides past the nose of the lever 16, so that the lever 16 swings counterclockwise, and its nose engages the lateral edge 19 extending perpendicularly from the lower edge 18. Now the force of the lever spring 17, which previously acted transversely of the direction of displacement of the cover plate, begins to act on the perpendicular end surface 19 of the cover plate, so that the cover plate continues to move under the action of the lever 16, irrespective of the further displacement of the slider 5, into its fully open position (FIG. 3). The extent of movement of the slider 5 is determined by the blocking of the film transport device at the moment when the feeler lever of the transport device drops into the next perforation of the film, and thus the film is transported further by one picture length. Now the photographic exposure is effected by pressure upon the release knob 4, and then the slider 5 can be returned into the basic position according to FIGS. 1 and 2. During this return movement, the coupling 24 between the slider and the film transport device does not cause further film feeding, however the shutter cocking or tensioning is expediently performed during this return movement of the slider, in the conventional way.

In FIG. 3 the slider 5 had to travel a medium displacement distance lying between its maximum and its minimum displacement distances, in order to advance the film by one picture length. If now the slider is moved rightwardly toward its basic position, the slider extension 8 first travels a short idle distance b, before it comes to abut on the right side edge of the aperture 9 of the cover plate 6. Then by further displacement of the slider 5 the cover plate 6 is moved in the direction toward its closed position, the nose of the lever 16 sliding down from the edge 19 of the projection 14, cocking the spring 17, and coming to abut on the lower edge 18 of the projection 14. If the slider is situated in its basic position the cover plate 6 is transferred completely into its closed position. The lever force of the lever 16 acts transversely of the displacement direction of the cover plate 6, so that the auxiliary drive of the lever 16 is ineffective. An additional locking of the cover plate 6 or of the slider 5 in the closed and basic positions is therefore unnecessary.

What is claimed is:

1. A photographic camera having film transport means, a rectilinearly moved slider for driving said film transport means, and a cover plate operable by means of said slider, said plate having a closed position covering viewfinder and lens openings and having an open position which clears said openings, characterized by the fact that said slider (5) and cover plate (6) are coupled with one another with limited relative movement between them, and that an auxiliary drive (15, 16, 17) is provided for the displacement of the cover plate into its said open position.

2. A camera according to claim 1, wherein said auxiliary drive (15, 16, 17) is ineffective when the cover plate (6) is in its closed position and can be set in action only by movement of the cover plate out of its closed position.

3. A camera according to claim 2, wherein said cover plate moves in a displacement direction, and wherein said auxiliary drive comprises a pivoted lever (16) and a spring (17) acting on said lever, said lever exerting force in a direction transversely of the displacement direction of the cover plate, when the cover plate is in its closed position, said lever swinging on its pivot upon movement of the cover plate out of its closed position into a position in which said lever exerts force in the direction of displacement of the cover plate.

4. A camera according to claim 3, wherein said cover plate (6) carries a projection (14) having a first surface (18) extending substantially parallel to said displacement direction and a second surface (19) extending substantially perpendicular to said displacement direction, and wherein said lever (16) is pivoted to swing about a fixed point (15), said lever having a portion which abuts on said first surface (18) when the cover plate is in its closed position and abuts on said second surface (19) when the cover plate has been moved out of its closed position, this abutment in each case being under the force of said spring (17).

5. A camera according to claim 4, characterized by the fact that the distance of said second surface (19) from the point at which said lever (16) abuts on said first surface (18) when said cover plate (6) is in the closed position, is not more than the difference between the minimum displacement distance of the film transport slider (5) necessary for one picture advancement of the film and an idle lost motion distance in the coupling of said slider to said cover plate.

6. A camera according to claim 1, wherein the coupling between said slider and said cover plate is characterized by an idle distance a which renders possible said relative movement between said slider and said cover plate, which distance is not less than the difference between the displacement distance of the cover plate (6) from its closed position into its open position and the minimum displacement distance of said slider (5) necessary for advancement of film by one picture length.

7. A camera according to claim 6, wherein said slider (5) and said cover plate (6) are both movable in respective displacement directions which are parallel to each other, and wherein said cover plate (6) has an aperture (9) and said slider (5) has an extension (8) engaged in said aperture, and wherein the length of the aperture in the displacement direction is equal to the sum of the width of the extension in the displacement direction and said idle distance (a).

8. A camera according to claim 7, wherein said slider and said cover plate are so dimensioned that when the slider (5) is in its basic position and the cover plate (6) is in the closed position, the slider extension (8) abuts on the one end of the aperture, holding the cover plate in its closed position.

9. A photographic camera comprising a housing having a lens window, a cover plate movable through a predetermined range of displacement travel from a closed position obscuring said window to an open position fully clearing said window, a manually operable film feeding and cover plate operating member movable from a rest position through a variable distance to feed film and to at least initiate movement of said cover plate from its closed position toward its open position, and auxiliary drive means rendered effective upon an initial movement of said cover plate for shifting said cover plate fully to its open position notwithstanding discontinuance of movement of said manually operable member.

10. A camera as defined in claim 9 wherein said auxiliary drive means comprises a spring powered member operatively acting upon said cover plate in a direction substantially perpendicular to the direction of displacement travel of said cover plate so long as said cover plate is in its closed position, and acting upon said cover plate in a direction substantially parallel to the direction of displacement travel of said cover plate when said cover plate has been moved a predetermined initial distance from its closed position toward its open position.

* * * * *